US012634382B1

(12) United States Patent
Li

(10) Patent No.: US 12,634,382 B1
(45) Date of Patent: May 19, 2026

(54) MULTI-TENANT SYSTEM FOR PRELOADING CACHE BASED ON FREQUENT ACCESS PATTERNS AND PRELOAD RULES

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 66 days.

(21) Appl. No.: 18/952,378

(22) Filed: Nov. 19, 2024

(51) Int. Cl.
　　*H04L 67/5681*　　(2022.01)
　　*H04L 43/04*　　　(2022.01)
　　*H04L 67/146*　　(2022.01)
(52) U.S. Cl.
　　CPC .......... *H04L 67/5681* (2022.05); *H04L 43/04* (2013.01); *H04L 67/146* (2013.01)
(58) Field of Classification Search
　　CPC .................................................. H04L 67/5681
　　See application file for complete search history.

(56) References Cited

U.S. PATENT DOCUMENTS

2017/0286675 A1* 10/2017 Shin .................... H04L 63/1416
2019/0332823 A1* 10/2019 Kwon ................... G06F 21/554

2021/0176259 A1* 6/2021 Park .................... H04L 63/1408
2021/0194921 A1* 6/2021 Guajardo Merchan ... G06F 8/65
2023/0109507 A1* 4/2023 Kim ........................ B60R 25/30
　　　　　　　　　　　　　　　　　　726/25

FOREIGN PATENT DOCUMENTS

EP　　　　　　4092553 A1 * 11/2022　.......... H04L 63/1425

* cited by examiner

*Primary Examiner* — Hee Soo Kim
(74) *Attorney, Agent, or Firm* — Buckley, Maschoff & Talwalkar LLC

(57) ABSTRACT

Systems and methods include determination of one or more objects fetched during each of a plurality of user sessions, determination of a first set of the user sessions associated with a first tenant, determination of first access patterns based on the one or more objects fetched during each of the first set of user sessions, determination of first related access patterns based on the first access patterns, determination of a first one or more preload rules for the first tenant based on the first related access patterns, identification of a first object of the first tenant read by the multi-tenant application, determination of one of the preload rules associated with the first object and indicating a second object, determination that the second object is not loaded into the cache and, in response, loading of the second object into the cache.

20 Claims, 9 Drawing Sheets

115

| TimeStamp | SessionId | Tenant | CacheKey |
|-----------|-----------|--------|----------|

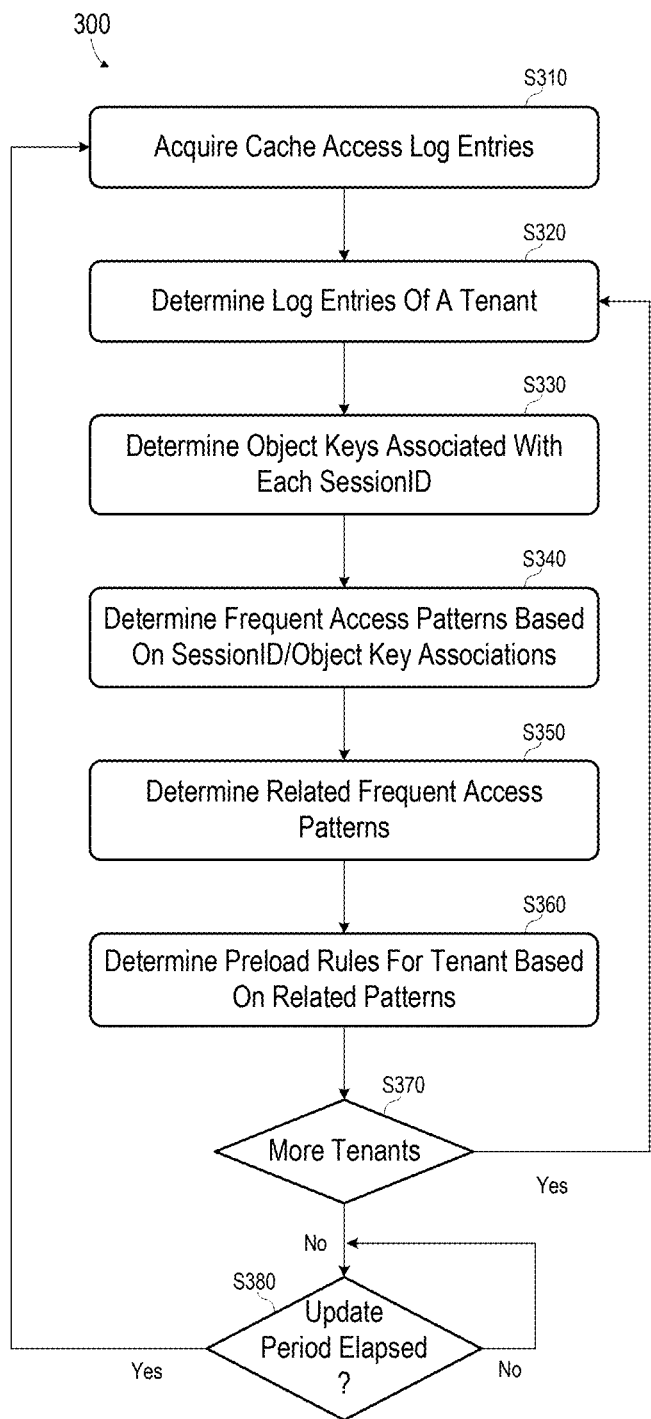

S310

Acquire Cache Access Log Entries

S320

Determine Log Entries Of A Tenant

S330

Determine Object Keys Associated With Each SessionID

S340

Determine Frequent Access Patterns Based On SessionID/Object Key Associations

S350

Determine Related Frequent Access Patterns

S360

Determine Preload Rules For Tenant Based On Related Patterns

S370

More Tenants

Yes

No

S380

Update Period Elapsed ?

Yes          No

| TimeStamp | SessionId | Tenant | CacheKey |
|---|---|---|---|
| 2023-10-21T14:35:07 | 123 | tenant1 | key0001 |
| 2023-10-21T14:35:08 | 124 | tenant1 | key0001 |
| 2023-10-21T14:35:09 | 125 | tenant1 | key0001 |
| 2023-10-21T14:35:10 | 126 | tenant1 | key0001 |
| 2023-10-21T14:35:11 | 127 | tenant1 | key0002 |
| 2023-10-21T14:35:12 | 128 | tenant1 | key0002 |
| 2023-10-21T14:35:13 | 129 | tenant1 | key0005 |
| 2023-10-21T14:35:14 | 130 | tenant1 | key0002 |
| 2023-10-21T14:35:15 | 131 | tenant1 | key0006 |
| 2023-10-21T14:35:16 | 132 | tenant1 | key0006 |
| 2023-10-21T14:35:17 | 133 | tenant1 | key0002 |
| 2023-10-21T14:35:18 | 134 | tenant1 | key0006 |
| 2023-10-21T14:35:19 | 135 | tenant1 | key0002 |
| 2023-10-21T14:35:20 | 123 | tenant1 | key0003 |
| 2023-10-21T14:35:21 | 124 | tenant1 | key0003 |
| 2023-10-21T14:35:22 | 125 | tenant1 | key0002 |
| 2023-10-21T14:35:23 | 126 | tenant1 | key0002 |
| 2023-10-21T14:35:24 | 127 | tenant1 | key0004 |
| 2023-10-21T14:35:25 | 128 | tenant1 | key0004 |
| 2023-10-21T14:35:26 | 129 | tenant1 | key0004 |
| 2023-10-21T14:35:27 | 130 | tenant1 | key0005 |
| 2023-10-21T14:35:28 | 131 | tenant1 | key0005 |
| 2023-10-21T14:35:29 | 132 | tenant1 | key0005 |
| 2023-10-21T14:35:30 | 133 | tenant1 | key0005 |
| 2023-10-21T14:35:31 | 134 | tenant1 | key0007 |
| 2023-10-21T14:35:32 | 135 | tenant1 | key0007 |

*FIG. 4*

| SessionId | CacheKeys |
|-----------|-----------|
| 123 | key0001, key0003, key0004, key0005 |
| 124 | key0001, key0003, key0004, key0005 |
| 125 | key0001, key0002, key0003, key0005 |
| 126 | key0001, key0002, key0003, key0005 |
| 127 | key0002, key0004, key0005 |
| 128 | key0002, key0004, key0005 |
| 129 | key0005, key0004, key0002 |
| 130 | key0002, key0005, key0006 |
| 131 | key0006, key0005, key0002 |
| 132 | key0006, key0005, key0002 |
| 33 | key0002, key0005, key0006, key0007 |
| 134 | key0006, key0007, key0002, key0005 |
| 135 | key0002, key0005, key0006, key0007 |
| 136 | key0002, key0005, key0006, key0007 |
| 137 | key0002, key0005, key0004, key0007, key0006 |

| frequent pattern | support probability |
|---|---|
| key0005 | 1.0 |
| key0002 | 0.8666666666666667 |
| key0006 | 0.5333333333333333 |
| key0002, key0005 | 0.8666666666666667 |
| key0002, key0006 | 0.5333333333333333 |
| key0005, key0006 | 0.5333333333333333 |
| key0002, key0005, key0006 | 0.5333333333333333 |

| Preload Rule | confidence |
|---|---|
| key0006 -> key0005 | 1.0 |
| key0006 -> key0002 | 1.0 |
| key0002 -> key0006 | 0.6153846153846153 |
| key0005 -> key0002 | 0.8666666666666667 |
| key0002 -> key0005 | 1.0 |
| key0006 -> (key0002, key0005) | 1.0 |
| key0002-> (key0005, key0006) | 0.6153846153846153 |

FIG. 7

MULTI-TENANT SYSTEM FOR PRELOADING CACHE BASED ON FREQUENT ACCESS PATTERNS AND PRELOAD RULES

BACKGROUND

Software applications are typically configured to request desired data from a cache. A cache is a memory, such as but not limited to an L1, L2 or L3 cache, from which a processing unit can quickly retrieve data. If desired data is not stored in the cache, the application fetches the data from another, slower, storage system (e.g., a database, a file system, or a remote source) and stores the data in the cache for future access.

Some systems utilize cache preloading to improve performance. Preloading refers to acquiring certain data objects and storing them in a cache even if the data objects have not yet been requested by an application. Then, when the application needs these objects, they can be fetched from the cache quickly.

Efficient preloading requires a suitable system for identifying data objects whose presence in the cache will improve application throughput. The system should also exclude data objects whose preloading would consume cache space without providing commensurate benefits. For example, the system should not identify data objects for preloading which will be evicted from the cache before they are fetched by the application.

Sequential preloading and semantic preloading have been used to identify data objects to preload into a cache. In sequential preloading, the identified data objects are data objects which are contiguous with and physically stored with a fetched data object. According to semantic preloading, the data objects to preload are identified based on the data structures and algorithms that are currently accessing the cache. For example, if a tree node is fetched into the buffer cache, it may be determined to preload all of its child nodes.

Existing preloading techniques are not suitable for certain operational scenarios. Systems for improved cache preloading are desired.

BRIEF DESCRIPTION OF THE DRAWINGS

FIG. 2 is a tabular representation of fields of a cache access log according to some embodiments.

FIG. 3 is a flow diagram of a process to determine preload rules according to some embodiments.

FIG. 4 is a tabular representation of a portion of a cache access log according to some embodiments.

FIG. 5 illustrates grouping of object identifiers from log entries according to some embodiments.

FIG. 6 illustrates request patterns determined based on log entries according to some embodiments.

FIG. 7 illustrates preload rules determined according to some embodiments.

DETAILED DESCRIPTION

The following description is provided to enable any person in the art to make and use the described embodiments. Various modifications, however, will remain readily-apparent to those in the art.

Figure 1:
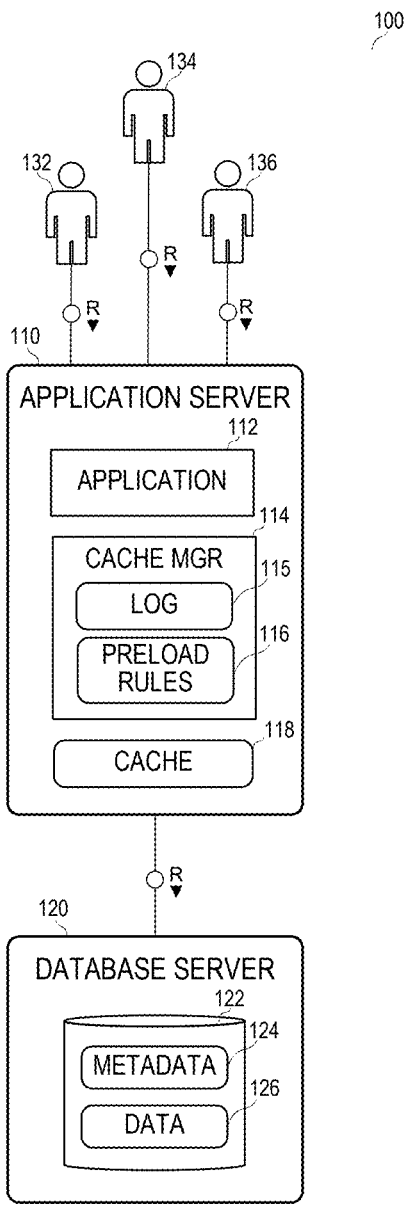
FIG. 1 illustrates a system providing cache preloading according to some embodiments.

FIG. 1 illustrates a system according to some embodiments. The illustrated components of FIG. 1 may be implemented using any suitable combinations of computing hardware and/or software that are or become known. The components of system 100 may be on-premise, cloud-based (e.g., in which computing resources are virtualized and allocated elastically), distributed (e.g., with distributed storage and/or compute nodes) and/or deployed in any other suitable manner. Each of servers 110 and 120 may comprise one or more servers, virtual machines, clusters of a container orchestration system and any other combination that is or becomes known. All or a part of each system may utilize Infrastructure-as-a-Service (IaaS), Platform-as-a-Service (PaaS) and/or Software-as-a-Service (SaaS) offerings owned and managed by one or more different entities as is known in the art.

Application server 110 may provide an operating system, services, I/O, storage, libraries, frameworks, etc. to applications executing therein. Application 112 may comprise program code executable by a processing unit of application server 110 to provide functions based on coded logic and data. Application 112 may provide any computing functions that are or become known.

Application 112 may comprise a multi-tenant application, but embodiments are not limited thereto. Multi-tenancy is a software architecture pattern which facilitates the sharing of computing resources (e.g., processor cycles, memory) among disparate groups of users. For example, a single multi-tenant application may serve requests received from several independent tenants (e.g., customers) each consisting of multiple end users. Such an application may use a much smaller computing resource footprint than would be required to provision one application per tenant.

Application server 110 also includes cache manager 114 and cache 118. Cache manager 114 may comprise program code which is execute to determine objects to preload into cache 118, determine objects to evict from cache 118, and generate entries of log 115, among other functions. Log 115 may comprise an access log in which each entry provides information related to a particular access of cache 118 by application 112 (or by other processes executing in application server 110).

Cache 118 may be implemented by any one or more memory devices from which a processing unit of server 110 may quickly access data, for example due to the inherent speed of the memory device, the speed of a connection between the processing unit and the memory device, and/or the distance between the processing unit and the memory device. Examples of cache 118 include but are not limited to high-speed static random-access memory. Cache 118 may include L1, L2 and/or L3 processor memory.

Cache manager 114 may determine preload rules 116 based on log 115 as will be described below. Moreover, cache manager 114 may determine objects to preload into cache 118 based on preload rules 116. Cache manager 114 may re-determine preload rules 116 periodically based on new entries of log 115.

Application 112 accesses database 122 of database server 120 during operation. Database 122 stores metadata 124 which describes the structure and interrelationships (i.e., the schema) of data 126. Data 126 may comprise tenant data as well as other data used by application 110. Data 126 may comprise tabular data stored in a columnar or row-based format, object data or any other type of data that is or becomes known. An object as described herein may comprise any logical group of data, including object data and data of one or more table rows. Metadata 124 and data 126 may be stored by application server 110 in some embodiments.

Database 122 may be multi-tenant aware, serving requests based on the tenant associated with the request. If database 122 is not multi-tenant aware, one schema of a single instance may be used for all tenants, where the data of each tenant is partitioned via a discriminating column. In this case, application 112 is responsible for tracking and managing the data in a tenant-aware manner, for example by using the values of the discriminating column to identify the data belonging to specific tenants.

Database 122 may be implemented using one or more storage systems, each of which may be standalone or distributed, on-premise or cloud-based. Database 122 may comprise any type of database, data warehouse, object store, or other storage system that is or becomes known.

Users 132, 134, 136 may operate respective user devices (not shown) to interact with application 112. Such user devices may execute Web browsers which request user interfaces from application 112 and present the user interfaces to users 132, 134, 136. The user devices may access application 112 via a gateway (not shown) which routes requests to application 112 and may also provide authentication, authorization, and load balancing.

Users 132, 134, 136 may be associated with different respective tenants. Each tenant may be a party to a distinct subscription/agreement/contract with a provider of application 112.

Figure 2:
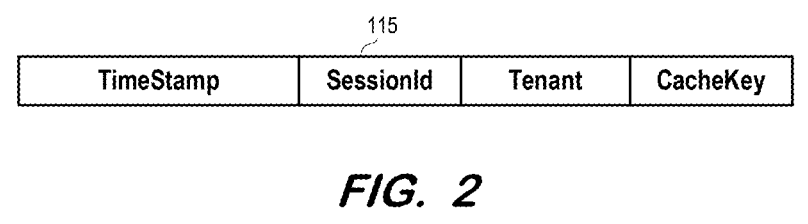

FIG. 2 is a tabular representation of fields of log 115 according to some embodiments. Embodiments are not limited to the fields of FIG. 2. Each entry of log 115 is associated with a single respective request to fetch an object from cache 118. Each entry specifies a timestamp of the request, an identifier of a session from which the request was received, a tenant associated with the session, and a key of the requested object. A session may comprise a period from logon of a given user to application 112 to user logoff. Log 115 may be stored in cache 118, data 134 and/or in any other suitable memory.

FIG. 3 is a flow diagram of process 300 to determine preload rules according to some embodiments. Process 300 and the other processes described herein may be performed using any suitable combination of hardware and software. Program code embodying these processes may be stored by any non-transitory tangible medium, including a fixed disk, a volatile or non-volatile random-access memory, a DVD-ROM, a Flash drive, a magnetic tape, and solid-state Random-Access Memory (RAM) or Read Only Memory (ROM) storage, and may be executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Prior to process 300, it is assumed that application 112 is executing to serve incoming requests. When an object is needed to serve a given request, application 112 fetches the object from cache 118. If the object is not located in cache 118, the object is retrieved from other storage such as database 122.

Execution of application 112 results in the creation of entries of log 115. As mentioned above, each entry specifies a timestamp of a cache request, an identifier of a session from which the cache request was received, a tenant associated with the session, and a key of the object requested from the cache. Log 115 may be occasionally stored in persistent storage such as database 122.

At S310, cache access log entries are acquired. The entries may be acquired from log 115 or from any storage including the entries. The acquired log entries may comprise all available log entries. In some embodiments, the acquired log entries may span a specified time period (e.g., the prior one month) and/or be limited to a certain number (e.g., the most-recent 10,000 log entries). Next, at S320, log entries associated with a particular tenant are determined from the acquired log entries.

FIG. 4 is a tabular representation of log entries 400 determined at S320 in some embodiments. As shown, each of log entries 400 is associated with the same tenant (i.e., tenant1). It is assumed that log entries 400 were determined from a larger set of log entries including log entries respectively associated with one or more other tenants.

Next, at S330, object keys associated with each session identifier are determined from the determined log entries. S330 is therefore a determination, for each session identified in the log entries, of which objects were accessed during the session. FIG. 5 illustrates object keys associated with each session identifier of a set of tenant-specific log entries determined at S330. It is noted that the associations of FIG. 5 reflect log entries 400 as well as other log entities which are not depicted in FIG. 4.

Frequent access patterns are determined at S340 based on the associated object keys and session identifiers. A frequent access pattern is a set of one or more objects which is accessed during a percentage of sessions which is greater than a minimum threshold percentage. In one example, a frequent access pattern is a set of one or more objects which is accessed during more than 50% of sessions.

Any suitable method may be employed to determine the frequent access patterns at S340. In some embodiments, the Apriori algorithm is used at S340. For example, for each object key shown in FIG. 5, the number of occurrences is counted and divided by the number of sessions to determine a probability for the object key. The probability for key0005 is $15/15=1.0$, and the probability for key0002 is $13/15=0.8667$.

Object keys having a probability of less than 0.5 (or other predefined threshold) are ignored, and all possible pairs of the remaining object keys are generated. Continuing the present example, the generated pairs are [key0005, key0002], [key0005, key0006], [key0006, key0002]. Next, a probability for each group is determined in the same manner as which a probability was determined for each object key. Groups having a probability of less than 0.5 are ignored.

The process continues to generate possible pairs of the remaining keys/groups, determine their probabilities, and discard pairs having a probability of less than 0.5 until no new groups can be formed. FIG. 6 illustrates probabilities determined for each object key and each group at S340 according to the present example.

Related ones of the frequent access pattern are determined at S350. According to some embodiments, all possible combinations X|Y of frequent patterns are first determined. Then, for each combination X|Y, the confidence P(X|Y) that pattern X will be accessed in a session if pattern Y is accessed in the session is determined as P(X|Y)=P(XY)/P (Y), where P(XY) and P(Y) are determined from the object key/session identifier associations determined at S330. The related patterns determined at S350 are those X, Y combinations for which P(X|Y) is greater than a minimum confidence (e.g., 0.6).

Preload rules are determined for the current tenant (i.e., tenant1) at S360 based on the related patterns determined at S350. Specifically, a preload rule Y→X is determined or each combination of patterns X, Y determined at S350. A preload rule Y→X indicates that if the objects of pattern Y are loaded into a cache, then, in response, the objects of pattern X should be preloaded into the cache.

FIG. 7 illustrates preload rules determined at S360 in the present example according to some embodiments. Each preload rule is shown in association with the confidence P(X|Y) determined at S350 for the related patterns X, Y of the preload rule. As shown, each confidence value is greater than the minimum confidence of 0.6.

Using smaller values for the probability at S340 or for the minimum confidence at S350 will result in more preload rules. The probability and minimum confidence values can be adjusted, on a per-tenant basis, as desired.

At S370, it is determined whether the log entries include entries associated with any other tenants. If so, flow returns to S320 to determine log entries for a next tenant. Flow proceeds through S330-S360 to determine preload rules for the next tenant based on the determined log entries. The preload rules may differ from the preload rules determined for other tenants. Flow cycles from S320 to S370 in this manner to determine preload rules for each tenant represented in the log entries, and flow then continues to S380.

S380 comprises a determination of whether an update period has elapsed. Generally, S380 determines whether the preload rules should be re-determined. S380 may comprise waiting for a particular period of time to elapse (e.g., 1 week), for a particular event to occur (e.g., detection of low cache hit rates), or any combination thereof.

Once the update period elapses, flow returns to S310 to acquire cache access log entries. The acquired log entries may include or exclude log entries which were previously used the determine preload rules. The acquired log entries may be associated with a particular time period (e.g., the prior 2 weeks) in some embodiments.

Figure 8:
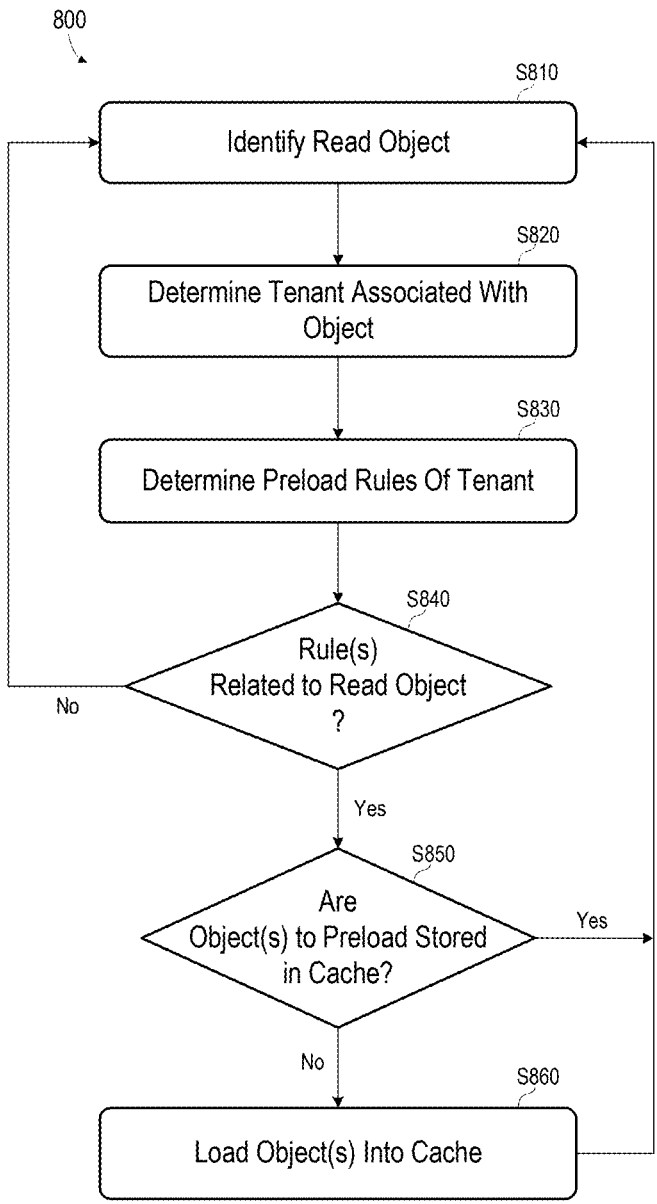
FIG. 8 is a flow diagram of a cache preloading process according to some embodiments.

FIG. 8 is a flow diagram of process 800 to preload a cache according to some embodiments. Process 800 may be performed by a cache manager such as cache manager 114 of FIG. 1.

Initially, the reading of an object by an application is identified at S810. The identified object may be read from a cache or, if it is not currently located in the cache, from another storage medium as described above.

A tenant associated with the object is determined at S820. The determined tenant is the tenant to which the object belongs. Preload rules of the tenant are determined at S830. The preload rules may be pre-determined as described with respect to process 300 and stored in association with an identifier of the tenant.

At S840, it is determined whether any of the preload rules are related to the loaded object identified at S810. S840 may comprise determining whether the object is identical to an object Y of any preload rule Y→X of the tenant. If not, flow returns to S810 to await the reading of another object.

In the present example, it will be assumed that object key0006 is identified at S810 and tenant1 is determined at S820. At S840, preload rules key0006→key0005, key0006→key0002, key0006→(key0002, key0005) are identified as related to the identified object. Therefore, at S850, it is determined whether the objects to be preloaded based on the identified preload rules (i.e., object key0002 and object key0005) are currently stored in the cache. If so, flow also returns to S810 to await the reading of another object. If it is determined that one or both of objects key0002 and key0005 are not stored in the cache, the unstored object(s) are loaded into the cache at S860 and flow returns to S810.

Figure 9:
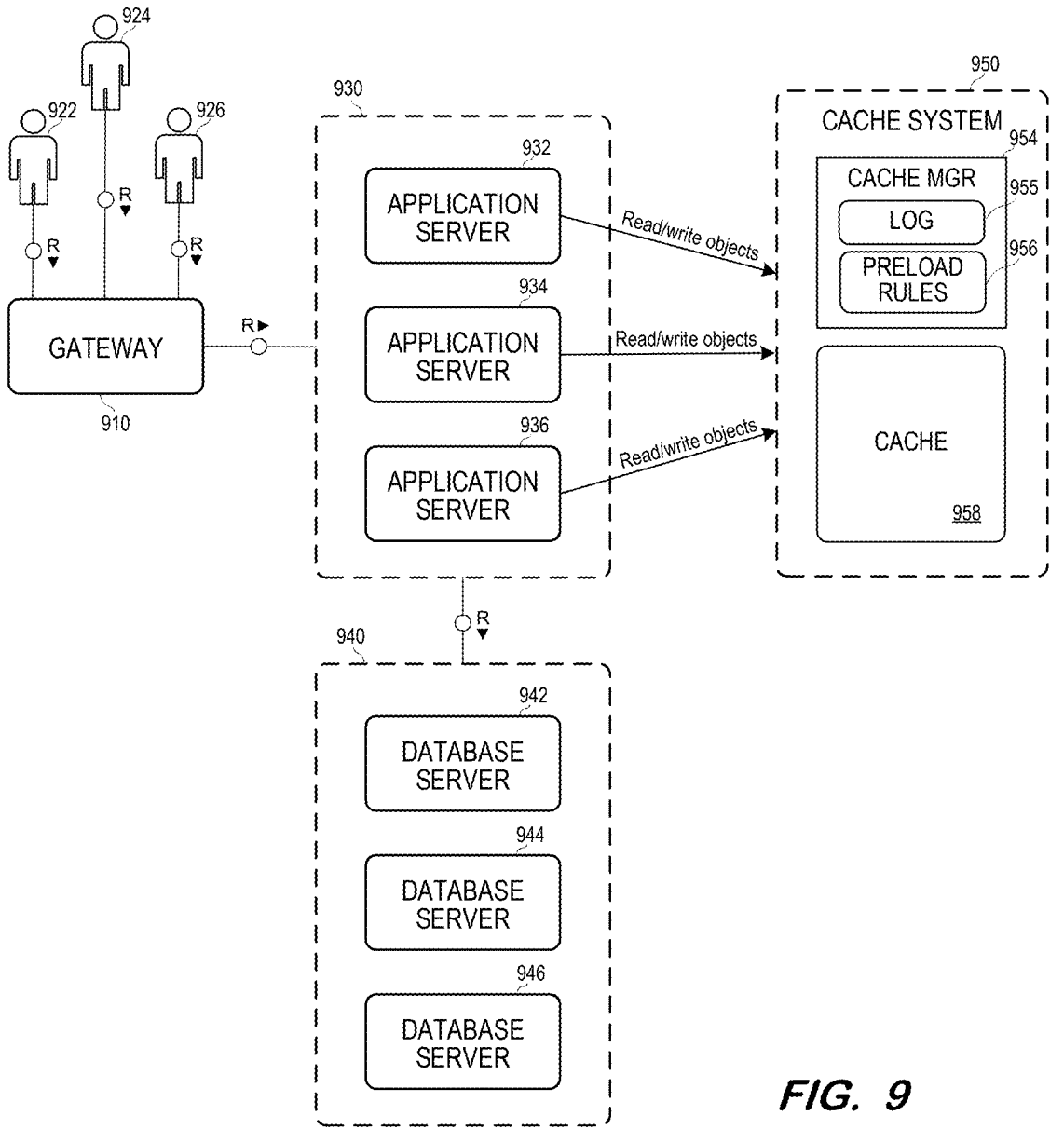
FIG. 9 illustrates an orchestration platform-based multi-tenant system providing tenant-based cache preloading according to some embodiments.

FIG. 9 illustrates an orchestration platform-based multi-tenant system providing tenant-based cache eviction according to some embodiments.

As mentioned above, gateway 910 may receive requests from users 922, 924 and 926 of disparate tenants. The requests may be associated with a multi-tenant application. Gateway 910 directs the requests to cluster 930 of server nodes 932, 934 and 936. As is known in the art, server nodes 932, 934 and 936 implement a container orchestration platform (e.g., Kubernetes) for execution of instances of the multi-tenant application. The application instances may access instances of a database application executing in cluster 940 of server nodes 942, 944 and 946. Each server node may comprise a virtual machine allocated by a cloud provider providing self-service and immediate provisioning, autoscaling, security, compliance and identity management features.

The application instances executing on server nodes 932, 934 and 936 access the database application instances executing on server nodes 942, 944 and 946 in order to create, read, update and delete objects belonging to the tenants of users 922, 924 and 926. These functions include reading and writing objects from and to shared cache 958 of cache system 950. Cache 958 may be an in-memory key-value distributed data store such as a Redis cache but embodiments are not limited thereto.

Cache manager 954 of cache system 950 maintains and updates log 955 and determines and applies preload rules 956 as described above. In the FIG. 9 implementation, the entries of log 955 reflect cache accesses of each application instance executing in cluster 920. Accordingly, preload rules 956 for a given tenant are based on cache accesses of the objects of the tenant by each application instance.

Figure 10:
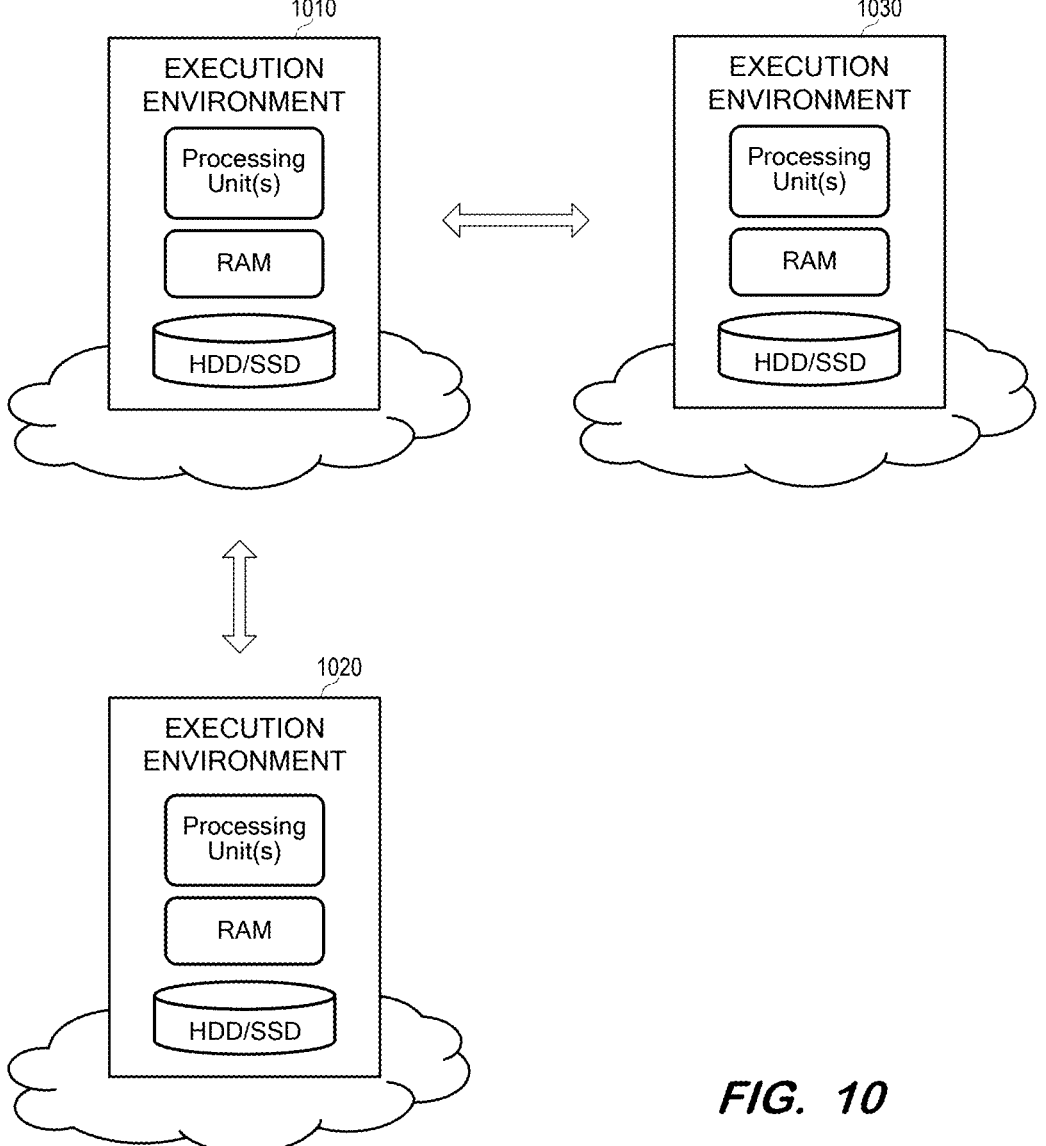
FIG. 10 illustrates a cloud-based architecture according to some embodiments.

FIG. 10 illustrates a cloud-based database deployment according to some embodiments. The illustrated components may comprise cloud-based compute resources residing in one or more public clouds providing self-service and immediate provisioning, autoscaling, security, compliance and identity management features.

Execution environments 1010-1030 may comprise servers or virtual machines of a Kubernetes cluster. Execution environments 1010-1030 may support containerized applications which provide one or more services to users. Execution environment 1010 may execute a multi-tenant application, execution environment 1020 may execute a database, and execution environment 1030 may execute a cache system as described herein.

The foregoing diagrams represent logical architectures for describing processes according to some embodiments, and actual implementations may include more, or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:

a cache storing a plurality of objects;

a memory storing executable program code; and one or more processing units to execute the executable program code to cause the system to:

determine, for each of the plurality of user sessions of a multi-tenant application, one or more objects fetched during the user session;

determine a first set of the plurality of user sessions associated with a first tenant;

determine first access patterns based on the one or more objects fetched during each of the first set of user sessions, each of the first access patterns comprising one or more objects;

determine first related access patterns based on the first access patterns;

determine a first one or more preload rules for the first tenant based on the first related access patterns;

identify a first object of the first tenant read by the multi-tenant application;

determine one of the first one or more preload rules associated with the first object, the one of the first one or more preload rules indicating a second object to be loaded into the cache in response to the reading of the first object;

in response to the determination of one of the first one or more preload rules associated with the first object, determine that the second object is not loaded into the cache; and in response to the determination that the second object is not loaded into the cache, load the second object into the cache.

2. The system of claim 1, the one or more processing units to execute the executable program code to cause the system to:

identify a third object of the first tenant read by the multi-tenant application;

determine a second one of the first one or more preload rules associated with the third object, the second one of the first one or more preload rules indicating a fourth object to be loaded into the cache in response to the reading of the third object; and in response to the determination of the second one of the first one or more preload rules associated with the third object, determine that the fourth object is loaded into the cache.

3. The system of claim 1, the one or more processing units to execute the executable program code to cause the system to:

identify a third object of the first tenant read by the multi-tenant application;

determine a second one of the first one or more preload rules associated with the third object, the second one of the first one or more preload rules indicating a fourth object to be loaded into the cache in response to the reading of the third object;

in response to the determination of the second one of the first one or more preload rules associated with the third object, determine that the third object is not loaded into the cache; and in response to the determination that the third object is not loaded into the cache, load the fourth object into the cache.

4. The system of claim 1, the one or more processing units to execute the executable program code to cause the system to:

determine a second set of the plurality of user sessions associated with a second tenant;

determine second access patterns based on the one or more objects fetched during each of the second set of user sessions, each of the second access patterns comprising one or more objects;

determine second related access patterns based on the first second patterns;

determine a second one or more preload rules for the second tenant based on the second related access patterns;

identify a third object of the second tenant read by the multi-tenant application;

determine one of the second one or more preload rules associated with the third object, the one of the second one or more preload rules indicating a fourth object to be loaded into the cache in response to the reading of the third object;

in response to the determination of one of the second one or more preload rules associated with the third object, determine that the fourth object is not loaded into the cache; and in response to the determination that the fourth object is not loaded into the cache, load the fourth object into the cache.

5. The system of claim 1, wherein determination of the first access patterns comprises:

determination of a set of one or more objects accessed during a percentage of the first set of user sessions which is greater than a minimum threshold percentage.

6. The system of claim 5, wherein determination of the first related access patterns based on the first access patterns comprises:

determination of pairs of the first access patterns for which a ratio of a probability that the pair will be accessed in a user session and a probability that one access pattern of the pair will be accessed in a user session is greater than a minimum confidence value.

7. The system of claim 1, wherein determination of the first related access patterns based on the first access patterns comprises:

determination of pairs of the first access patterns for which a ratio of a probability that the pair will be accessed in a user session and a probability that one access pattern of the pair will be accessed in a user session is greater than a minimum confidence value.

8. The system of claim 1, wherein determination of one or more objects fetched during each of the plurality of user sessions of the multi-tenant application comprises reading of log entries of a cache access log.

9. The system of claim 8, wherein the log entries of the cache access log represent objects of the first tenant fetched by a plurality of instances of the multi-tenant application.

10. A method comprising:

determining, for each of the plurality of user sessions of a multi-tenant application, one or more objects fetched during the user session;

determining a first set of the plurality of user sessions associated with a first tenant;

determining first access patterns based on the one or more objects fetched during each of the first set of user sessions, each of the first access patterns comprising one or more objects;

determining first related access patterns based on the first access patterns;

determining a first one or more preload rules for the first tenant based on the first related access patterns;

identifying a first object of the first tenant read by the multi-tenant application;

determining one of the first one or more preload rules associated with the first object, the one of the first one or more preload rules indicating a second object to be loaded into the cache in response to the reading of the first object;

in response to determining one of the first one or more preload rules associated with the first object, determining that the second object is not loaded into the cache; and in response to determining that the second object is not loaded into the cache, loading the second object into the cache.

11. The method of claim 10, further comprising:

identifying a third object of the first tenant read by the multi-tenant application;

determining a second one of the first one or more preload rules associated with the third object, the second one of the first one or more preload rules indicating a fourth object to be loaded into the cache in response to the reading of the third object; and in response to determining the second one of the first one or more preload rules associated with the third object, determining that the fourth object is loaded into the cache.

12. The method of claim 10, further comprising:

identifying a third object of the first tenant read by the multi-tenant application;

determining a second one of the first one or more preload rules associated with the third object, the second one of the first one or more preload rules indicating a fourth object to be loaded into the cache in response to the reading of the third object;

in response to determining the second one of the first one or more preload rules associated with the third object, determining that the third object is not loaded into the cache; and in response to determining that the third object is not loaded into the cache, loading the fourth object into the cache.

13. The method of claim 10, further comprising:

determining a second set of the plurality of user sessions associated with a second tenant;

determining second access patterns based on the one or more objects fetched during each of the second set of user sessions, each of the second access patterns comprising one or more objects;

determining second related access patterns based on the first second patterns;

determining a second one or more preload rules for the second tenant based on the second related access patterns;

identifying a third object of the second tenant read by the multi-tenant application;

determining one of the second one or more preload rules associated with the third object, the one of the second one or more preload rules indicating a fourth object to be loaded into the cache in response to the reading of the third object;

in response to determining one of the second one or more preload rules associated with the third object, determining that the fourth object is not loaded into the cache; and in response to determining that the fourth object is not loaded into the cache, loading the fourth object into the cache.

14. The method of claim 10, wherein determining the first access patterns comprises:

determination of a set of one or more objects accessed during a percentage of the first set of user sessions which is greater than a minimum threshold percentage.

15. The method of claim 14, wherein determining the first related access patterns based on the first access patterns comprises:

determination of pairs of the first access patterns for which a ratio of a probability that the pair will be accessed in a user session and a probability that one access pattern of the pair will be accessed in a user session is greater than a minimum confidence value.

16. The method of claim 10, wherein determining the first related access patterns based on the first access patterns comprises:

determination of pairs of the first access patterns for which a ratio of a probability that the pair will be accessed in a user session and a probability that one access pattern of the pair will be accessed in a user session is greater than a minimum confidence value.

17. The method of claim 10, wherein determining one or more objects fetched during each of the plurality of user sessions of the multi-tenant application comprises reading log entries of a cache access log.

18. The method of claim 17, wherein the log entries of the cache access log represent objects of the first tenant fetched by a plurality of instances of the multi-tenant application.

19. One or more computer-readable media storing program code executable by a computing system to cause the computing system to perform operations comprising:

determining, for each of the plurality of user sessions of a multi-tenant application, one or more objects fetched during the user session;

determining a first set of the plurality of user sessions associated with a first tenant;

determining first access patterns based on the one or more objects fetched during each of the first set of user sessions, each of the first access patterns comprising one or more objects;

determining first related access patterns based on the first access patterns;

determining a first one or more preload rules for the first tenant based on the first related access patterns;

identifying a first object of the first tenant read by the multi-tenant application;

determining one of the first one or more preload rules associated with the first object, the one of the first one or more preload rules indicating a second object to be loaded into the cache in response to the reading of the first object;

in response to determining one of the first one or more preload rules associated with the first object, determining that the second object is not loaded into the cache; and in response to determining that the second object is not loaded into the cache, loading the second object into the cache.

20. The one or more computer-readable media of claim 19, the program code executable by a computing system to cause the computing system to perform operations further comprising:

determining a second set of the plurality of user sessions associated with a second tenant;

determining second access patterns based on the one or more objects fetched during each of the second set of user sessions, each of the second access patterns comprising one or more objects;

determining second related access patterns based on the first second patterns;

determining a second one or more preload rules for the second tenant based on the second related access patterns;

identifying a third object of the second tenant read by the multi-tenant application;

determining one of the second one or more preload rules associated with the third object, the one of the second one or more preload rules indicating a fourth object to be loaded into the cache in response to the reading of the third object;

in response to determining one of the second one or more preload rules associated with the third object, determining that the fourth object is not loaded into the cache; and in response to determining that the fourth object is not loaded into the cache, loading the fourth object into the cache.

* * * * *